United States Patent
Guenter

(10) Patent No.: US 10,678,047 B2
(45) Date of Patent: Jun. 9, 2020

(54) ACHROMATIZED METASURFACE LENS

(71) Applicant: Microsoft Technology Licensing, LLC, Redmond, WA (US)

(72) Inventor: Brian Guenter, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 417 days.

(21) Appl. No.: 15/473,208

(22) Filed: Mar. 29, 2017

(65) Prior Publication Data

US 2018/0284428 A1    Oct. 4, 2018

(51) Int. Cl.

| | |
|---|---|
| *G02B 27/00* | (2006.01) |
| *G02B 27/01* | (2006.01) |
| *G02B 1/00* | (2006.01) |
| *G02B 5/20* | (2006.01) |
| *H04N 5/225* | (2006.01) |

(52) U.S. Cl.
CPC ........... *G02B 27/0025* (2013.01); *G02B 1/00* (2013.01); *G02B 1/002* (2013.01); *G02B 5/201* (2013.01); *G02B 27/017* (2013.01); *H04N 5/2257* (2013.01); *G02B 2207/101* (2013.01)

(58) Field of Classification Search
None
See application file for complete search history.

(56) References Cited

U.S. PATENT DOCUMENTS

| | | | |
|---|---|---|---|
| 5,642,227 A | 6/1997 | Rallison | |
| 10,297,180 B2* | 5/2019 | Shi | ........................ G02B 5/30 |
| 2009/0091644 A1 | 4/2009 | Mackey | |
| 2009/0284696 A1 | 11/2009 | Cheong et al. | |
| 2014/0185142 A1* | 7/2014 | Gupta | ............... G02B 27/1086 359/630 |
| 2015/0253574 A1 | 9/2015 | Thurber | |
| 2015/0323795 A1 | 11/2015 | Alton et al. | |

(Continued)

FOREIGN PATENT DOCUMENTS

EP      2653907 A1      10/2013

OTHER PUBLICATIONS

"International Search Report and Written Opinion Issued in PCT Application No. PCT/US18/022525", dated Jun. 12, 2018, 15 Pages.

(Continued)

*Primary Examiner* — Kenneth B Lee, Jr.

(57) ABSTRACT

An achromatized metasurface lens that includes a color filter array and a metasurface lens located proximate to the color filter array. The color filter array includes a plurality of color filter elements for different colors of light. The metasurface lens includes a corresponding plurality of subsets of nanostructures based on the color filter array. Each respective subset of nanostructures is optically aligned with a corresponding color filter element. For example, a subset of nanostructures configured to modify a particular color of light may be optically aligned with a color filter element that filters light of the same particular color. The achromatized metasurface lens may be incorporated into a display system, such as a head-mounted-display. The display system may also include a narrowband display source tuned to the color filter elements in the color filter array.

20 Claims, 8 Drawing Sheets

(56) References Cited

U.S. PATENT DOCUMENTS

2016/0041390 A1* 2/2016 Poon .................. G02B 3/04
345/8
2016/0306079 A1 10/2016 Arbabi et al.
2016/0316180 A1 10/2016 Han et al.

OTHER PUBLICATIONS

"Harvard ultra-thin "Flat Lens" achromatic metasurface for VR", https://forums.oculus.com/community/discussion/21011/harvard-ultra-thin-flat-lens-achromatic-metasurface-for-vr, Published on: Mar. 2015, 6 pages.

Arbabi, et al., "An optical metasurface planar camera", In Publication of arXiv, Apr. 21, 2016, pp. 1-29.

Howlett, Eric, "LeepVR", In Proceedings of International Society for Optical Engineering, Feb. 1990, 17 pages.

Rolland, et al., "Development of Head-Mounted Projection Displays for Distributed, Collaborative, Augmented Reality Applications", In Journal of Presence, vol. 14, No. 5, Oct. 2005, pp. 528-549.

Mencagli, et al., "Metasurface transformation optics", In Journal of Optics, vol. 16, Nov. 27, 2014, pp. 1-9.

Wang, et al., "Chromatic-aberration-corrected diffractive lenses for ultra-broadband focusing", In Journal of Scientific Reports, vol. 6, Feb. 12, 2016, pp. 1-7.

Kildishev, et al., "Planar Photonics with Metasurfaces", In Journal of Science, vol. 339, Issue 6125, Mar. 15, 2013, 9 pages.

Yu, et al., "Flat optics with designer metasurfaces", In Journal of Nature Materials, vol. 13, Jan. 23, 2014, pp. 139-150.

Meinzer, et al., "Plasmonic Meta-atoms and Metasurfaces", In Journal of Nature Photonics vol. 8, No. 12, Dec. 2014, pp. 1-22.

Jahani, et al., "All-dielectric metamaterials", In Journal of Nature Nanotechnology, vol. 11, Jan. 7, 2016, pp. 23-36.

Zhang et al., "Advances in full control of electromagnetic waves with metasurfaces", In Journal of Advanced Optical Materials, Mar. 2016, pp. 1-16.

Vo, et al., "Sub-wavelength grating lenses with a twist", In Journal of IEEE Photonics Technology Letters, vol. 26, Issue 13, Jul. 1, 2014, pp. 1375-1378.

Arbabi, et al., "Subwavelength-thick Lenses with High Numerical Apertures and Large Efficiency Based on High Contrast Transmitarrays", In Journal of Nature Communications, vol. 6, May 7, 2015, pp. 1-10.

Zheng, et al., "Metasurface holograms reaching 80% efficiency", In Journal of Nature Nanotechnology, vol. 10, Feb. 23, 2015, pp. 1-7.

Arbabi, et al., "Dielectric metasurfaces for complete control of phase and polarization with subwavelength spatial resolution and high transmission", In Journal of Nature Nanotechnology, vol. 10, Aug. 31, 2015, pp. 1-27.

Arbabi, et al., "Efficient dielectric metasurface collimating lenses for mid-infrared quantum cascade lasers", In Journal of Optics express vol. 23, No. 26, Dec. 28, 2015, pp. 33310-33317.

Eric R. Fossum, "CMOS image sensors: electronic camera-on-a-chip", In Journal of IEEE Transactions on Electron Devices, vol. 44, Issue: 10, Oct. 1997, pp. 1689-1698.

Fattal, et al., "Flat dielectric grating reflectors with focusing abilities", In Journal of Nature Photonics, vol. 4, May 2, 2010, pp. 1-5.

Aieta, et al., "Aberration-free ultrathin flat lenses and axicons at telecom wavelengths based on plasmonic metasurfaces", In Journal of Nano Letters, vol. 12, Issue 9, Aug. 15, 2012, 5 pages.

Lin, et al., "Dielectric gradient metasurface optical elements", In Journal of Science, vol. 345, Issue 6194, Jul. 18, 2014, pp. 298-302.

Arbabi, et al., "Controlling the Phase Front of Optical Fiber Beams using High Contrast Metastructures", In Journal of OSA Technical Digest (Optical Society of America, 2014), Jun. 8, 2014, 2 pages.

Liu, et al., "S4: A free electromagnetic solver for layered periodic structures", In Proceedings of Computer Physics Communications, vol. 183, Issue 10, Oct. 2012, pp. 2233-2244.

Born, et al., "Principles of Optics", In Publication of Cambridge University Press, Oct. 13, 1999, 31 pages.

Aieta, et al., "Aberrations of flat lenses and aplanatic metasurfaces", In in Journal of Optics express vol. 21, No. 25, Dec. 13, 2013, pp. 31530-31539.

Khorasaninejad, et al., "Achromatic Metalens over 60 nm Bandwidth in the Visible and Metalens with Reverse Chromatic Dispersion", In Journal of Nano Letters, Volume, Jan. 26, 2017, 6 pages.

Arbabi, et al., "Miniature optical planar camera based on a wide-angle metasurface doublet corrected for monochromatic aberrations", In Journal of Nature Communications, vol. 7, Nov. 28, 2016, pp. 1-9.

Kamali, et al., "Decoupling optical function and geometrical form using conformal flexible dielectric metasurfaces", In Journal of Nature Communications, vol. 7, May 19, 2016, 22 pages.

Buralli, et al., "Design of a wide field diffractive landscape lens", In Proceedings of Applied Optics, vol. 28, Issue 18, Sep. 15, 1989, pp. 3950-3959.

Ren, et al., "Orbital Angular Momentum-based Space Division Multiplexing for High-capacity Underwater Optical Communications", In Journal of Scientific Reports, vol. 12, Issue 6, Sep. 12, 2016, pp. 1-10.

Wiener, Norbert, "Extrapolation, Interpolation, and Smoothing of Stationary Time Series", In Publication of MIT Press, Mar. 1964.

Zhan, et al., "Low-contrast dielectric metasurface optics", In Journal of ACS Photonics, vol. 3, Issue2, Feb. 1, 2016, 15 pages.

Xu, et al., "Plasmonic nanoresonators for highresolution colour filtering and spectral imaging", In Journal of Nature Communications, vol. 1, Aug. 24, 2010, pp. 1-5.

Fesenmaier, et al., "Optical confinement methods for continued scaling of CMOS image sensor pixels", In Journal of Optics Express, vol. 16, Issue 25, Dec. 8, 2008, pp. 20457-20470.

Aieta, et al., "Multiwavelength achromatic metasurfaces by dispersive phase compensation", In Journal of Science, vol. 347, Issue 6228, Mar. 20, 2015, pp. 1-15.

Arbabi, et al., "Multiwavelength polarization insensitive lenses based on dielectric metasurfaces with metamolecules", In Journal of Optica, vol. 3, Issue 6, Jun. 10, 2016, pp. 628-633.

Arbabi, et al., "High efficiency double-wavelength dielectric metasurface lenses with dichroic birefringent meta-atoms", In Journal of Optics Express, vol. 24, Issue 16, Aug. 8, 2016, 9 pages.

Arbabi, et al., "Multiwavelength metasurfaces through spatial multiplexing", In Journal of Scientific Reports, vol. 6, Sep. 6, 2016, pp. 1-8.

Lalanne, et al., "Blazed binary subwavelength gratings with efficiencies larger than those of conventional echelette gratings", In Journal of Optics Letter, vol. 23, Issue 14, Jul. 15, 1998, pp. 1081-1083.

Lalanne, et al., "Design and fabrication of blazed binary diffractive elements with sampling periods smaller than the structural cutoff", In Journal of the Optical Society of America, vol. 16, Issue 5, May 1999, pp. 1143-1156.

* cited by examiner

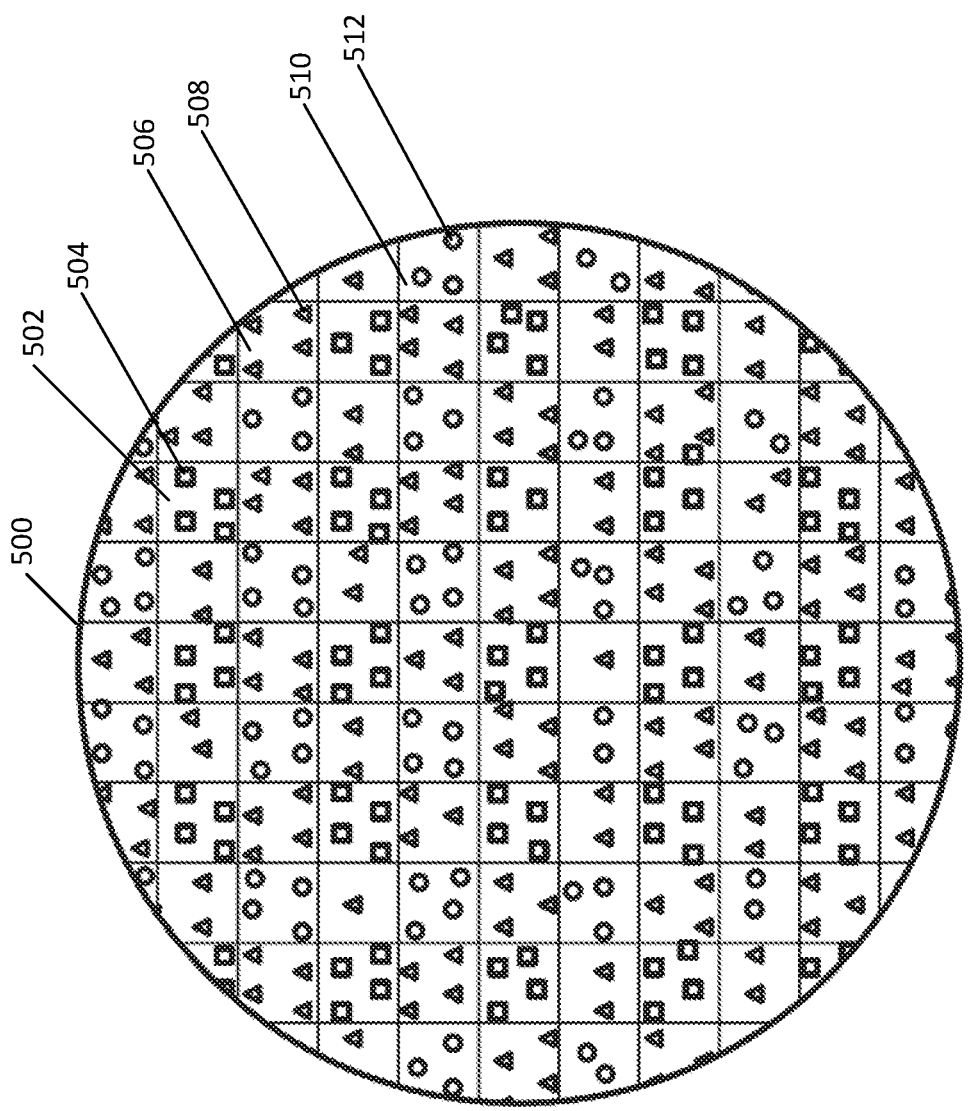

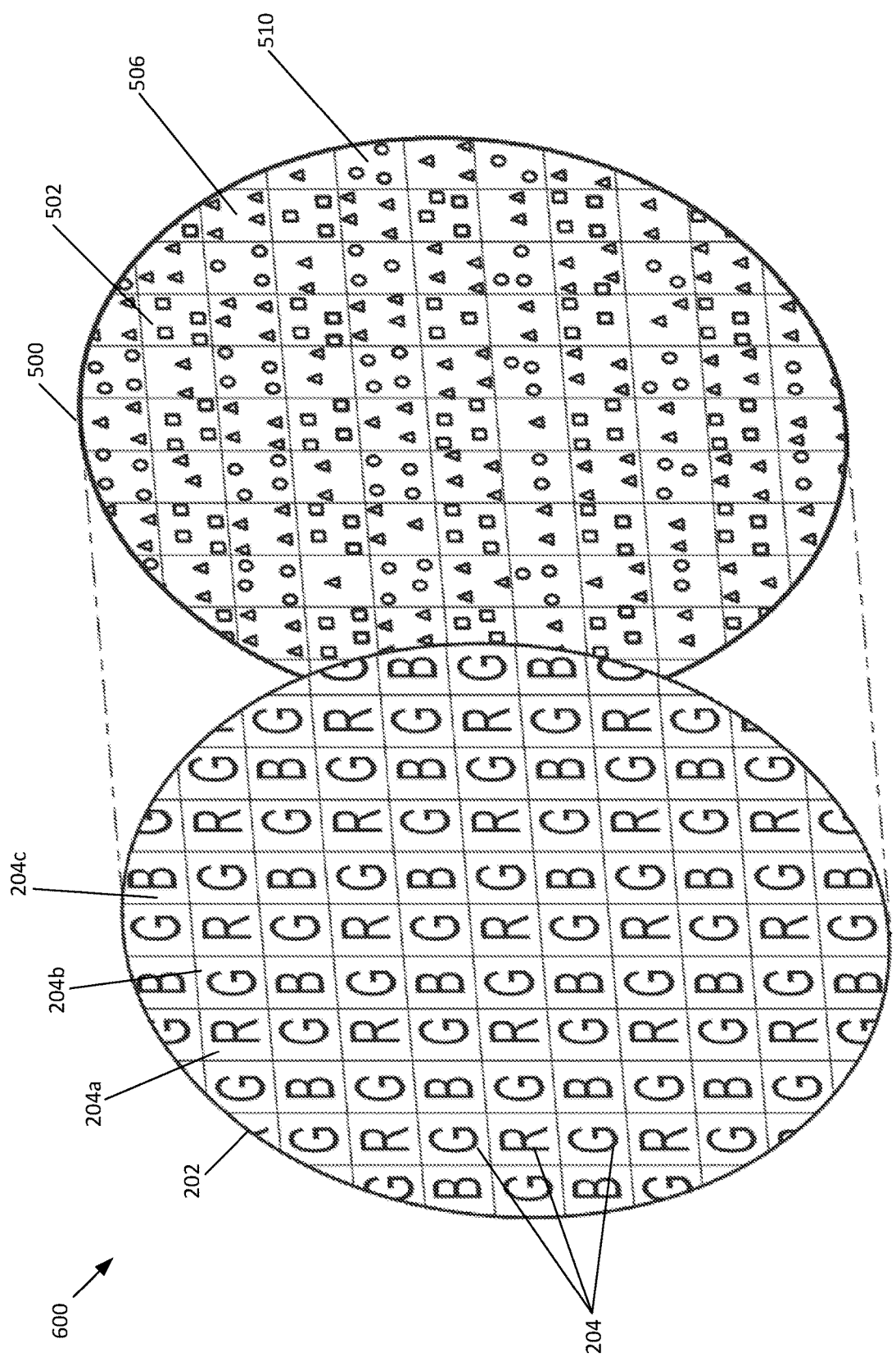

ACHROMATIZED METASURFACE LENS

Traditionally, focusing optics have generally relied on glass lenses based on refraction principles according to Snell's Law. While the use of glass lenses has been optimized for many different uses, glass lenses may be too thick or bulky for some applications. One such application is in the use of head-mounted displays, such as virtual reality or augmented reality headsets. Because the head-mounted display is attached to user's head, there is a general preference to have the head-mounted display be compact and lightweight. Use of traditional lenses, however, do not allow for a size of head-mounted display to drop below a particular threshold. Other optics, such as cameras and projection units, among others, suffer from similar limitations when traditional optics are used.

SUMMARY

The technology relates to an achromatized metasurface lens, display systems incorporating the achromatized metasurface lens, and methods for making the achromatized metasurface lens. The achromatized metasurface lens includes a color filter array and a metasurface lens having subsets of nanostructures corresponding to color filter elements in the color filter array. For instance, in one example, the color filter array may include color filter elements for the color red, color filter elements for the color green, and color filter elements for the color blue. In such an example, the metasurface lens includes a subset of nanostructures configured to modify red light, a subset of nanostructures configured to modify green light, and a subset of nanostructures configured to modify blue light. Each respective subset of nanostructures is optically aligned with a corresponding color filter element. For instance, each subset of nanostructures configured to modify red light may be optically aligned with a red color filter element. By configuring the color filter array and the metasurface lens of the achromatized metasurface lens in such a manner, chromatic aberrations traditionally associated with metasurface lenses may be avoided.

The achromatized metasurface lens may be incorporated into a display system, such as a head-mounted display. The display system includes a display source that emits light that propagates to the achromatized metasurface lens. The metasurface lens modifies the light, such as by collimating the light. The collimated light then propagates to a viewing position. In some examples, the display source may be a narrowband display source that emits narrow bands of light tuned to the color filter elements in the achromatized metasurface lens. For instance, in the above example where the color filter elements are configured to filter the colors red, green, and blue, respectively, the narrowband display source may include illuminants that emit narrow bands of red light, green light, and blue light. By using such narrowband illuminants, chromatic aberrations in the display system may be further reduced.

The achromatized metasurface lens may be manufactured through lithographic or other suitable manufacturing methods. For instance, a metasurface lens may be manufactured from a nanostructure design for the achromatized metasurface lens. The nanostructure design may include a design for the subsets of nanostructures configured to modify different colors of light. In some examples, the color filter array may be manufactured on top of, or proximate to, the metasurface lens to create the achromatized metasurface lens.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The same number represents the same element or same type of element in all drawings.

FIG. 5 depicts a nanostructure design of a metasurface lens according to an example of the present technology.

FIG. 6 depicts an exploded perspective view of the achromatized metasurface lens according to an example of the present technology.

DETAILED DESCRIPTION

Figure 1A:
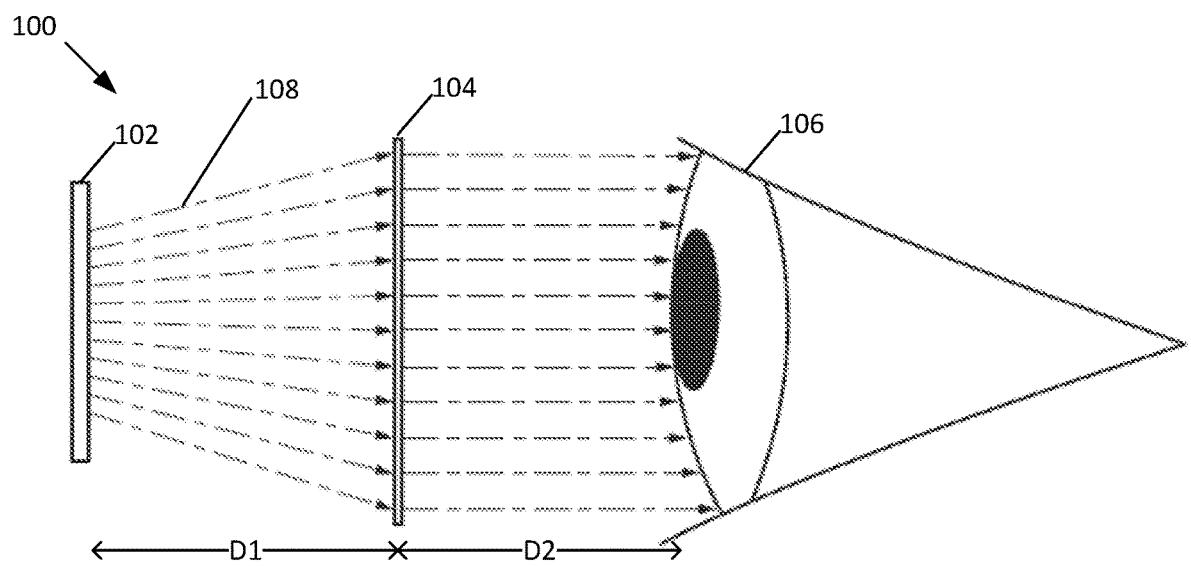
FIG. 1A depicts a display system having a display source and an achromatized metasurface lens according to an example of the present technology.

The present technology provides for an achromatized metasurface lens that is able to precisely modify multiple wavelengths of light to substantially reduce chromatic aberrations. Optical metasurface lenses are two-dimensional arrays of nanostructures, or nano-scatterers that modify optical wavefronts at a subwavelength spatial resolution. Optical metasurface lenses are beneficial in that they can be made almost completely flat and incredibly thin. They also generally do not cause any spherical aberrations when modifying light. Existing metasurface lenses, however, have shown poor performance across multiple wavelengths of light, such as across the visible band of light from approximately 450 nm to 680 nm. The existing metasurfaces perform well for a single wavelength or narrow band of wavelengths, but the performance degrades quickly for different wavelengths, causing chromatic aberrations. A chromatic aberration is an effect produced by the refraction or modification of different wavelengths of electromagnetic radiation through slightly different angles, resulting in a failure to focus. The present technology provides for an achromatized metasurface lens that, in part, improves the performance of metasurface lenses across multiple wavelengths to reduce chromatic aberrations.

The present achromatized metasurface lens incorporates a color filter array of a plurality of color filter elements fabricated on top of, or proximate to, a metasurface lens. The design of the nanostructures varies across the achromatized metasurface lens such that nanostructures below a particular color filter element correspond to the wavelength of light for that particular color filter element. Accordingly, only a narrow band of wavelengths passes through each color filter element and interacts with the subset of nanostructures designed for that respective wavelength of light. By having such a design, the achromatized metasurface lens is able to modify multiple narrow bands of wavelengths of light differently to reduce chromatic aberrations of previous metasurface lenses and improve performance across the visible spectrum.

The color filter elements in the array, however, may not have sufficiently narrow passbands for each of the color filter elements for some display systems. As such, a wide band of wavelengths of light may still pass through each of the color filter elements and interact with the metasurface lens. The band of wavelengths passed through a particular element may therefore be wide enough to still cause chromatic aberrations. To reduce the chromatic aberrations, the display source used with the achromatized metasurface lens may be configured to have illuminants that emit light at narrow bands of wavelengths tuned to the color filter elements used in the color filter array. Such a display source is referred to herein as a narrowband display source. Incorporating such a narrowband display source and the achromatized metasurface lens into a display system further improves performance of the resultant display system, such as a head-mounted display system.

FIG. 1A depicts a display system 100 having a display source 102 and an achromatized metasurface lens 104 according to an example of the present technology. More specifically, FIG. 1A depicts a user 106 viewing a display source 102 through an achromatized metasurface lens 104. The display source 102 emits light, represented by the light rays 108, that diverges from the display source 102 as it propagates from the display source 102. Upon reaching the achromatized metasurface lens 104, the light rays 108 are modified by the achromatized metasurface lens 104 to collimate the light rays 108. The collimated light rays 108 then propagate to the user 106 or, more specifically, the user's eye(s). Each light ray 108 represents light having a plurality of wavelengths or colors. As depicted, the light ray 108 is collimated without chromatic aberration during the collimation process by the achromatized metasurface lens 104.

In some examples, the distance D1 between the display source and the achromatized metasurface lens may be about 40-60 mm and the distance D2 between the achromatized metasurface lens and the user's eye may be between about 15-20 mm. In some examples, the ratio between the distance D1 and the distance D2 is between about 1.5:1 and 5:1. Other distances are also possible depending on the particular application.

The display source 102 may be any type of display source appropriate for the desired application. For instance, the display source 102 may be a liquid crystal display (LCD) source, a liquid crystal on silicon (LCoS) display a light-emitting diode (LED) display source, or an organic LED (OLED) display source, among other known types of the display sources. The display source 102 may also be a narrowband display source. A narrowband display source is a display source that has illuminants or light sources that are tuned to a color filter array of the achromatized metasurface lens, as discussed further below. The illuminants may be tuned to the color filter array by utilizing narrowband illuminants matching the same colors in the color filter array. For instance, in a traditional LCD source, a white-light illuminant is generally implemented in the LCD source. Such a traditional LCD source may be configured to be a narrowband display source by replacing the white-light illuminant with a plurality of illuminants matching the colors of the color filter array. For example, red, green, and blue laser diodes or LEDs may be used as illuminants for a color filter array including red, green, and blue color filter elements. For LED or OLED displays, nanodots, quantum dots, or other similar technology may be used to narrow emission bandwidths to correspond to a particular color filter array. In some examples, a narrowband illuminant emits light having a bandwidth of less than about 10 nm full width at half maximum (FWHM). In other examples, a narrowband illuminant emits light having a bandwidth of less than about 2 nm FWHM, or between about 1-2 FWHM.

Figure 1B:
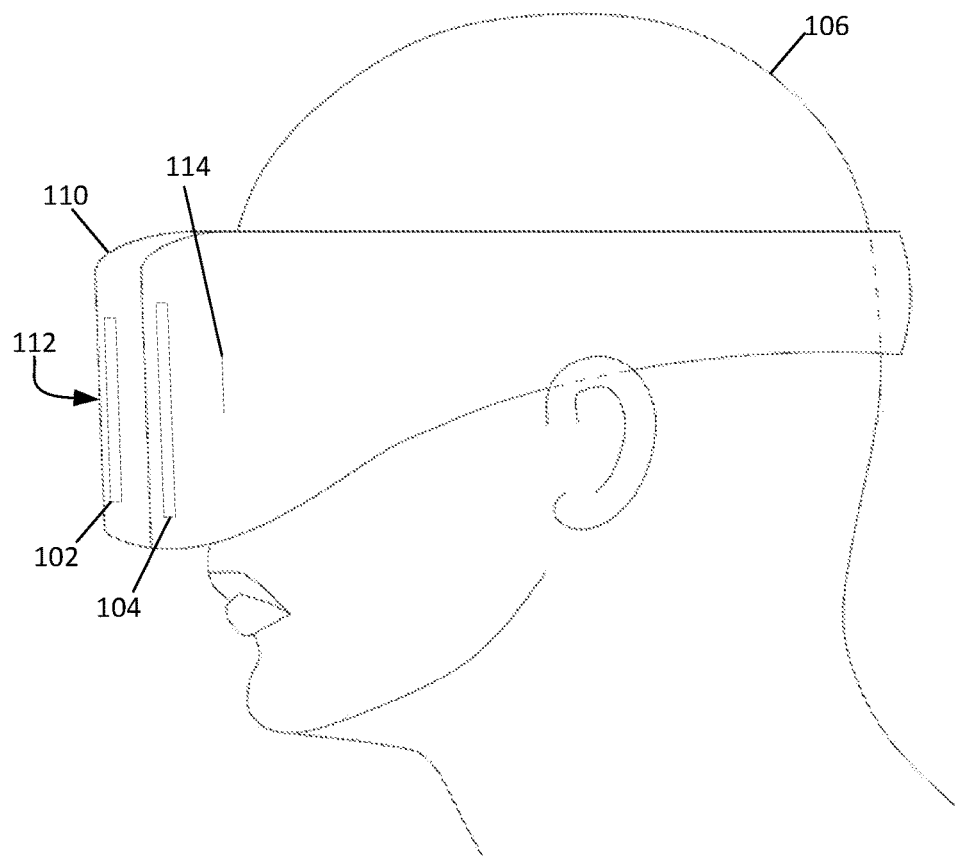
FIG. 1B depicts a head-mounted display incorporating an achromatized metasurface lens and a narrowband display source according to an example of the present technology.

FIG. 1B depicts a head-mounted display system ("HMD") 110 incorporating the achromatized metasurface lens 104 and a display source 102 according to an example of the present technology. The HMD 110 may be worn by a user 106 to provide content to the user 106 through the display source 102, such as virtual reality content or augmented reality content. In the example of providing augmented reality content, the front surface of HMD 110 may incorporate one or more cameras to allow for an augmented video stream to be presented to the user 106 through the display source 102, which may be referred to as video augmented reality. The HMD 110 may also include integrated computing components to provide content as a stand-alone system. The HMD 110 may also include wireless or wired connectivity features to receive content from other computing devices, such as mobile phones, tablets, laptops, desktops, and the like.

The display source 102 and the achromatized metasurface lens 104 in the HMD 110 may have a similar configuration and relative spacing as depicted in FIG. 1A, discussed above. For instance, the display source 102 may be located towards the front surface 112 of the head-mounted display. The achromatized metasurface lens 104 is located in between the display source 102 and a viewing position 114 for the HMD 110 such that light emitting from the display source 102 passes through the achromatized metasurface lens 104 to the viewing position 114. The viewing position 114 of the HMD 110 may be a position at which an average user's eye would be located when the HMD 110 is worn by a user. Further, the display source 102 may be in the shape of a square having a width of about 40-60 mm, and the achromatized metasurface lens may be in the shape of a circle with a diameter of about 30-40 mm. Other sizes, shapes, and configurations of the display source 102 and the achromatized metasurface lens 104 are possible and will vary depending on the particular application, shape, and size of the HMD 110. The display source 102 may be affixed to towards the front of the HMD 110 using any means known to those having skill in the art. The achromatized metasurface lens 104 may be affixed between an eye of the user 106 and the display source 102 using any means known to those having skill in the art. In some examples, the HMD 110 includes multiple display sources 102 and achromatized metasurface lenses 104. For instance, the HMD 110 may include a display source 102 for each eye and an achromatized metasurface lens 104 for each eye. In some examples, the display source 102 may be a narrowband display source.

Figure 2A:
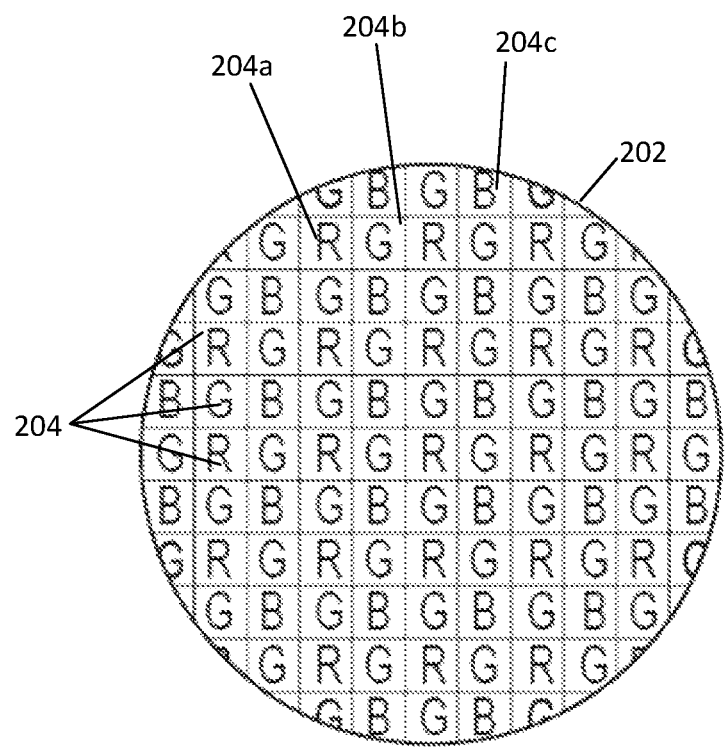
FIG. 2A depicts a color filter array including a plurality of color filter elements according to an example of the present technology.

FIG. 2A depicts a color filter array 202 including a plurality of color filter elements 204 according to an example of the present technology. The example color filter array 202 depicted in FIG. 2A includes color filter elements 204 corresponding to three different colors—red, green, and blue. The red color filter elements 204a, green color filter elements 204b, and the blue color elements 204c are arranged in a pattern similar to that of a Bayer filter commonly used in digital photography applications. Other patterns are also possible, including other sequential or lattice patterns. The different color filter elements 204 may also be arranged in a pseudorandomized pattern to reduce potential diffraction artifacts of light passing through the color filter array. As should be understood, the depicted color filter array 202 is not drawn to scale. In examples, each of the color filter elements 204 is on the order of tens of microns or smaller. In some examples, each of the color filter elements 204 may have a length, width, and/or diameter of between approximately 1-10 microns, and therefore each color filter element may have a surface area between about 1-100 square microns. Further, in some examples, the color filter elements 204 may vary in size and shape and need not directly border other color filter elements. For instance, the color filter elements 204 may be have a circular or dot shape, among other potential shapes.

Each of the color filter elements 204 filters incoming light, such as light emitted from a display source. For instance, the red color filter elements 204a filter incoming light such that only red light passes through each red color filter element 204a, the green color filter elements 204b filter incoming light such that only green light passes through each green color filter element 204b, and the blue color filter elements 204c filter incoming light such that only blue light passes through each blue color filter element 204a.

Figure 2B:
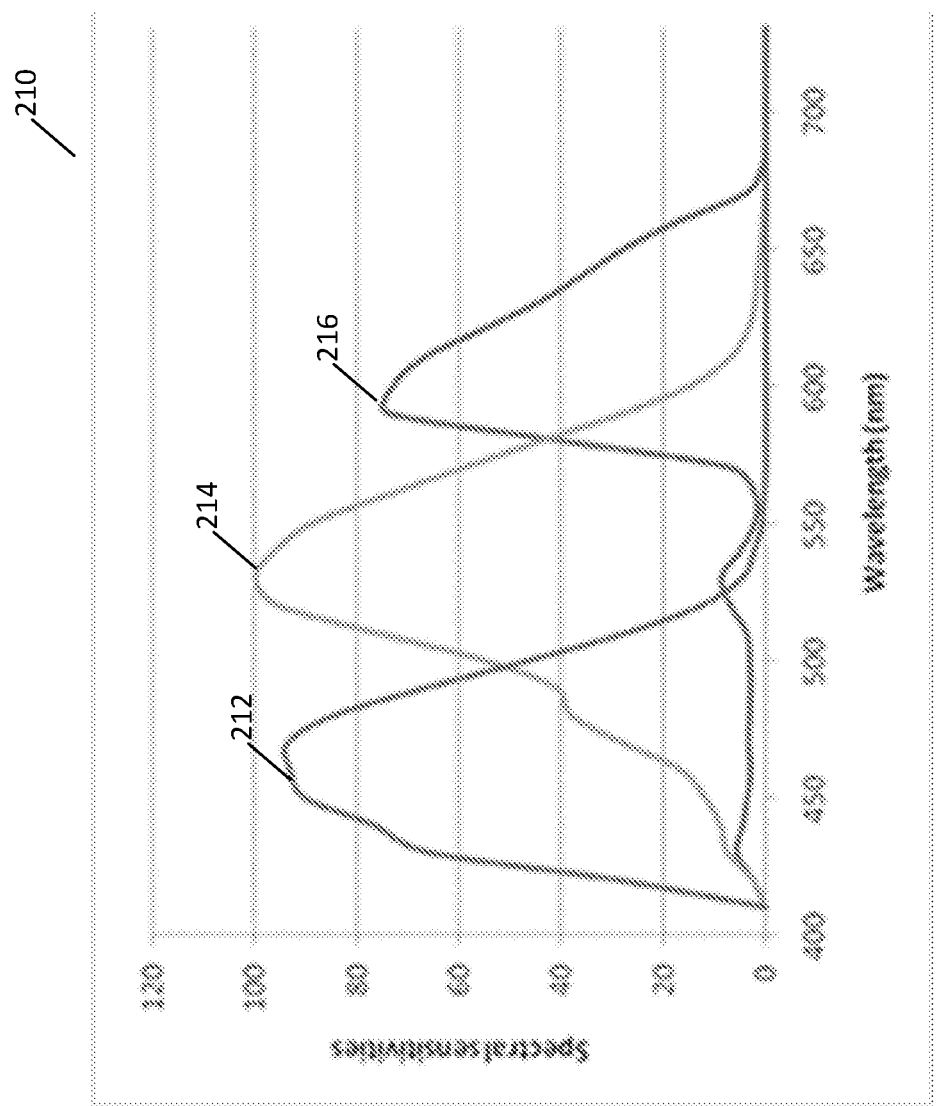
FIG. 2B depicts a spectral sensitivity plot for a sample color filter according to an example of the present technology.

The color filter elements 204, however, may not have narrow passbands. As an example, FIG. 2B depicts a spectral sensitivity plot 210 for color filter elements 204 in a sample color filter array 202. The spectral sensitivity, or quantum efficiency, represented on the y-axis of the plot 210 represents the proportion of incident photons that pass through the filter for a particular wavelength or color. The plot 210 includes a blue curve 212 for a sample blue filter element 204c, a green curve 214 for a sample green filter element 204b, and a red curve 216 for a sample red filter element 204a. Based the blue curve 212, the sample blue filter element 204c passes the greatest amount of photons for light having wavelengths between about 440-475 nm with a peak at about 470 nm. Based the green curve 214, the sample green filter element 204b passes the greatest amount of photons for light having wavelengths between about 530-550 nm with a peak at about 540 nm. Based the red curve 216, the sample red filter element 204a passes the greatest amount of photons for light having wavelengths between about 575-600 nm with a peak at about 590 nm. Each of the sample color filter elements 204, however, still pass light that is not at the peak wavelength for each respective color. For instance, the sample green filter element 204b still passes some amount of light at about 500 nm, which is more commonly seen as a cyan or blue color. Because the nanostructures on a metasurface lens are generally designed for a particular wavelength of light, or narrow band of wavelengths, the additional photons of different wavelengths that pass through a respective color filter element 204 may be improperly modified by a metasurface lens not designed for those additional wavelengths. The improper modification results in chromatic aberrations.

To prevent such chromatic aberrations, one option is to utilize color filter elements 204 that have narrower passbands. Thus, only desired narrow bands of wavelengths of light are allowed to pass through each color filter element 204. If sufficiently narrow narrowband color filter elements 204 cannot be utilized or are not implemented, another option to prevent chromatic aberrations is to incorporate a narrowband display source into the display system along with the achromatized metasurface lens. The narrowband display source may then be tuned to the peak wavelengths for each of the respective color filter elements 204. As an example, for a narrowband LCD display source, the illuminants in the LCD display may include laser diodes or LEDs that are tuned to the peak wavelengths of the respective color filter elements 204. For instance, for use with the sample color filter elements 204 having the properties depicted in plot 210, the narrowband LCD display may include three illuminants—a first illuminant tuned to 470 nm, a second illuminant tuned to 540 nm, and a third illuminant tuned to 590 nm. By utilizing laser diodes or LEDs with narrow bands around the desired peak wavelengths of the color filter elements, light from a single illuminant will be more predominately passed through each respective filter element. For OLED or LED display sources, quantum dot or nanodot technology may be used to narrow the wavelength bands of light emitted from the display source. The use of narrowband color filter elements 204 in conjunction with a narrowband display source may also further improve the performance of a display system.

In other examples, the color filter array 202 may be designed to better handle natural light across the visible spectrum. For instance, while the example color filter array 202 depicted in FIG. 2A utilizes three different colors for color filter elements 204, the color filter array may be designed with more or less than three different colors. For instance, the color filter array may be designed with a 256 color array. The underlying metasurface lens may then have subsets of nanostructures and designs corresponding to each of the 256 colors. Such an example would perform better with white light illuminants, natural light, and display sources configured for a 256 color display. As another example, the color filter array may include color filter elements for two colors, such as red and green. More or less different color filter elements 204 may be used depending on the particular application and display source.

Figure 3C:
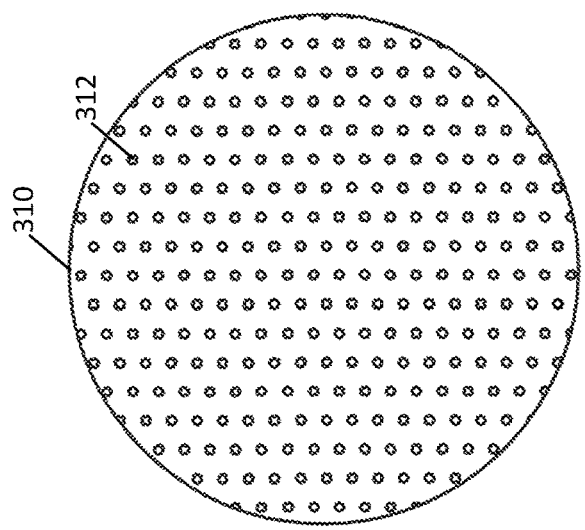
FIG. 3C depicts a metasurface lens designed for a third wavelength of light according to an example of the present technology.
Figure 3B:
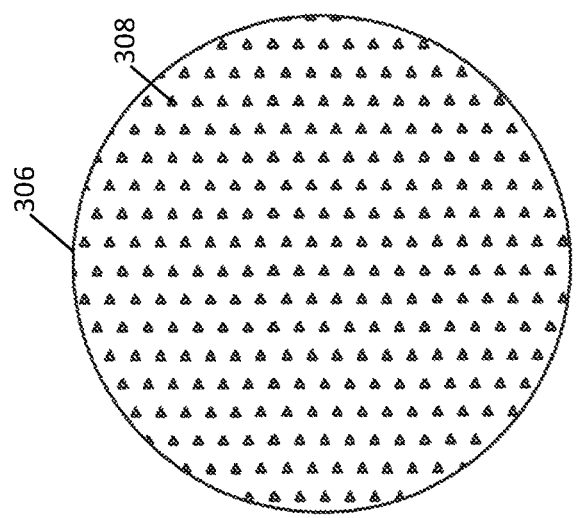
FIG. 3B depicts a metasurface lens designed for a second wavelength of light according to an example of the present technology.
Figure 3A:
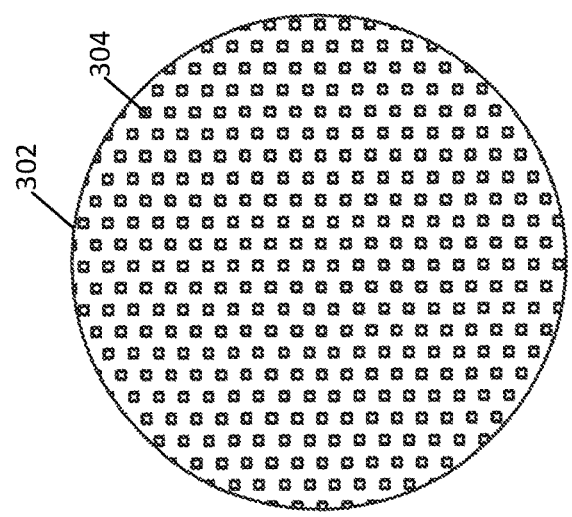
FIG. 3A depicts a metasurface lens designed for a first wavelength of light according to an example of the present technology.

FIG. 3A depicts a metasurface lens 302 designed for a first wavelength of light according to an example of the present technology. The metasurface lens 302 includes a plurality of nanostructures 304 that are designed specifically to modify the first wavelength of the light in a particular manner, such as changing its propagation direction. As an example, the nanostructures 304 may be designed such that the metasurface lens 302 operates as a collimating lens for a wavelength corresponding to the color red, such as 590 nm. The nanostructures 304 and their pattern on the metasurface lens 302 may influence how the light is modified by the metasurface lens 302.

FIG. 3B depicts a metasurface lens 306 designed for a second wavelength of light according to an example of the present technology. The metasurface lens 306 includes a plurality of nanostructures 308 that are designed specifically to modify the second wavelength of the light in a particular manner, such as changing its propagation direction. As an example, the nanostructures 308 may be designed such that the metasurface lens 306 operates as a collimating lens for a wavelength corresponding to the color green, such as 540 nm. The nanostructures 308 and their pattern on the metasurface lens 306 may influence how the light is modified by the metasurface lens 306.

FIG. 3C depicts a metasurface lens 310 designed for a third wavelength of light according to an example of the present technology. The metasurface lens 310 includes a plurality of nanostructures 312 that are designed specifically to modify the second wavelength of the light in a particular manner, such as changing its propagation direction. As an example, the nanostructures 312 may be designed such that the metasurface lens 310 operates as a collimating lens for a wavelength corresponding to the color blue, such as 470 nm. The nanostructures 312 and their pattern on the metasurface lens 310 may influence how the light is modified by the metasurface lens 310.

As should also be understood, the nanostructures depicted in FIGS. 3A-3C are not drawn to scale. For instance, the nanostructures 304 in FIG. 3A are not drawn to scale or to the particular pattern or shape of nanostructures used in metasurface lens for modifying 590 nm light. Rather, the nanostructures 304 are depicted as squares to more easily distinguish them from the nanostructures 308 in FIG. 3B and the nanostructures 312 in FIG. 3C for purposes of this disclosure. Similarly, the nanostructures 308 and the nanostructures 312 are also not drawn to scale or to the particular pattern or shape of nanostructures used in metasurface lenses for modifying 540 nm and 470 nm light, respectively. As will be understood by one having skill in the art, each of the actual nanostructures used in a metasurface lens may generally be subwavelength in size. In addition, while the metasurface lenses and color filter elements discussed herein are described as being designed the particular wavelength, the particular wavelength may be a peak wavelength for emitted light or a narrow band of wavelengths of light. Further, the design and manufacture of a metasurface lens for a particular wavelength is known in the art, and any of those known design methods for a nanostructures on metasurface lens for a particular wavelength may utilized in conjunction with the present technology. For example, the reference Amir Arbabi, et al., *Miniature optical planar camera based on a wide-angle metasurface doublet corrected for monochromatic aberrations*, Nature Communications 7, Article number: 13682 (2016); doi:10.1038/ncomms13682 (hereinafter "the Arbabi reference"), sets forth design principles and manufacturing techniques suitable for use with the present technology. The Arbabi reference is incorporated herein in its entirety.

Figure 4C:
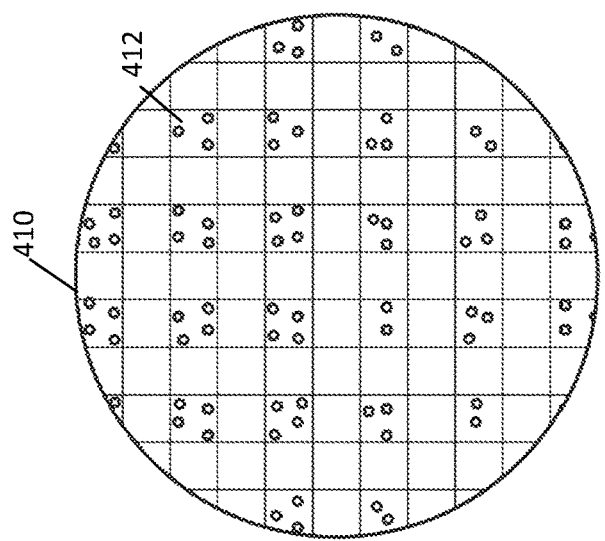
FIG. 4C depicts a portion of the metasurface design for a third wavelength depicted in FIG. 3C corresponding to the color filter array depicted in FIG. 2 according to an example of the present technology.
Figure 4B:
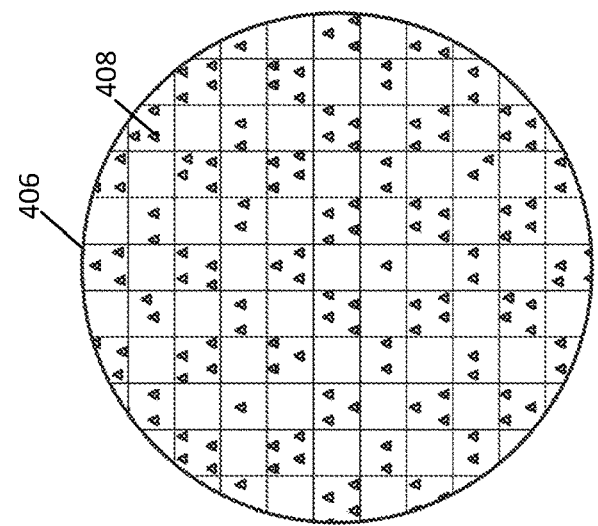
FIG. 4B depicts a portion of the metasurface design for a second wavelength depicted in FIG. 3B corresponding to the color filter array depicted in FIG. 2 according to an example of the present technology.
Figure 4A:
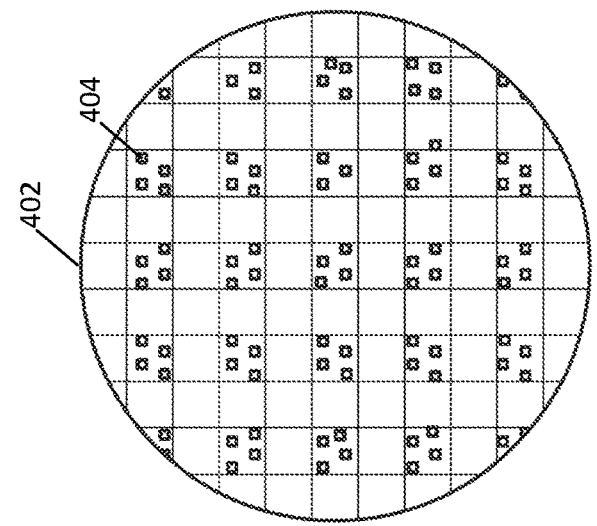
FIG. 4A depicts a portion of the metasurface design for a first wavelength depicted in FIG. 3A corresponding to the color filter array depicted in FIG. 2 according to an example of the present technology.

FIG. 4A depicts a portion of the metasurface design for a first wavelength depicted in FIG. 3A corresponding to the color filter array depicted in FIG. 2 according to an example of the present technology. The metasurface lens 402 depicted in FIG. 4A includes subsets of nanostructures 404 in the same shape and pattern as the nanostructures 304 depicted in FIG. 3A, except only portions of the nanostructures 304 are included as the subsets of nanostructures 404 in the metasurface lens 402. The locations and size of the subsets of nanostructures 404 correspond to color filter elements for the first wavelength of a color filter array to be used in an achromatized metasurface lens. For instance, where the nanostructure design is for a red color wavelength, the portions of nanostructures 404 correspond to the red color filter elements of a color filter array. As depicted in FIG. 4A, the subsets of nanostructures 404 incorporated into the metasurface lens 402 correspond to the locations and sizes of the red color filter elements 204a of color filter array 202 depicted in FIG. 2A.

As should also be understood, similar to FIGS. 3A-3C, the nanostructures depicted in FIGS. 4A-4C are not drawn to scale for similar reasons as discussed above. In an example, where the size of color filter element is on the order of tens of microns, a manufactured metasurface lens may have hundreds of nanostructures in each subset corresponding to particular filter element.

FIG. 4B depicts a portion of the metasurface design for a second wavelength depicted in FIG. 3B corresponding to the color filter array depicted in FIG. 2 according to an example of the present technology. The metasurface lens 406 depicted in FIG. 4B includes subsets of nanostructures 406 in the same shape and pattern as the nanostructures 308 depicted in FIG. 3B, except only portions of the nanostructures 308 are included as the subsets of nanostructures 408 in the metasurface lens 406. The locations and size of the subsets of nanostructures 408 correspond to color filter elements for the second wavelength of a color filter array to be used in an achromatized metasurface lens. For instance, where the nanostructure design is for a green color wavelength, the portions of nanostructures 408 correspond to the green color filter elements of a color filter array. As depicted in FIG. 4B, the subsets of nanostructures 408 incorporated into the metasurface lens 406 correspond to the locations and sizes of the green color filter elements 204b of color filter array 202 depicted in FIG. 2A.

FIG. 4C depicts a portion of the metasurface design for a third wavelength depicted in FIG. 3C corresponding to the color filter array depicted in FIG. 2 according to an example of the present technology. The metasurface lens 410 depicted in FIG. 4C includes subsets of nanostructures 412 in the same shape and pattern as the nanostructures 312 depicted in FIG. 3C, except only portions of the nanostructures 312 are included as the subsets of nanostructures 412 in the metasurface lens 410. The locations and size of the subsets of nanostructures 412 correspond to color filter elements for the third wavelength of a color filter array to be used in an achromatized metasurface lens. For instance, where the nanostructure design is for a blue color wavelength, the portions of nanostructures 412 correspond to the blue color filter elements of a color filter array. As depicted in FIG. 4C, the subsets of nanostructures 412 incorporated into the metasurface lens 410 correspond to the locations and sizes of the blue color filter elements 204c of color filter array 202 depicted in FIG. 2A.

FIG. 5 depicts a nanostructure design of a metasurface lens 500 according to an example of the present technology. The nanostructure design on the metasurface lens 500 is a combination of the designs shown in FIGS. 4A-C. Accordingly, the nanostructure design on the metasurface lens 500 includes subsets of nanostructures tuned for different wavelengths and arranged according to a color filter array. More specifically, the example metasurface lens 500 depicted in FIG. 5 includes a subset nanostructures 502 for a first wavelength of light, a subset of nanostructures 506 for a second wavelength of light, and a subset of nanostructures 510 for a third wavelength of light. The nanostructure design for metasurface lens 500 may then be used as manufacturing design to manufacture a metasurface lens for use as an achromatized metasurface lens.

FIG. 6 depicts an exploded perspective view of an achromatized metasurface lens 600 according to an example of the present technology. The achromatized metasurface lens 600 includes a color filter array 202 and a metasurface lens 500. The metasurface lens 500 includes a plurality of subsets of nanostructures 502, 506, 510 tuned to color filter elements 204 in the color filter array 202. For instance, each of the subsets of nanostructures 502, 506, 510 is optically aligned with a corresponding color filter element 204 in the color filter array 202. As an example, each of the subsets of nanostructures 502 tuned for a red wavelength of light corresponds in location and size to a red color filter element 204a. Thus, when light passes through one of the red color filter elements 204a the red-filtered light interacts with the subset of nanostructures 502 tuned for the wavelength of light corresponding to red. Similarly, each of the subsets of nanostructures 506 tuned for a green wavelength of light corresponds to a green color filter element 204b and each of the subsets of nanostructures 510 tuned for a blue wavelength of light corresponds to a blue color filter element 204c. Thus, when light passes through one of the green color filter elements 204b the green-filtered light interacts with the subset of nanostructures 504 tuned for the wavelength of light corresponding to green, and when light passes through one of the blue color filter elements 204c the blue-filtered light interacts with the subset of nanostructures 504 tuned for the wavelength of light corresponding to blue. Because each of the subsets of nanostructures 502, 506, 510 is tuned its corresponding color filter element 204, the light can be modified by the achromatized metasurface lens 600 to prevent monochromatic aberrations for light sources emitting red, green, and blue light. As discussed above, the color filter array 202 and metasurface 500 may be designed for different or additional colors depending on the particular application.

The color filter array 202 may be manufactured directly on the metasurface lens 500 to create the achromatized metasurface lens 600. As an example, the color filter array 202 may be effectively "painted" on the metasurface lens 500 to cover the respective subsets of nanostructures 502, 506, 510. For instance, the color filter array 202 may be lithographically produced on the metasurface lens 500 such that each color filter element 204 is located on the correct correspond subset of nanostructures. The incorporation of the color filter array 202 onto the metasurface lens 500 may be integrated into the lithographic manufacturing process of the metasurface lens 500. Similar techniques utilized in applying color filters, such as Bayer filters, to light sensors in digital cameras may be utilized to apply the color filter array 202 to the metasurface lens 500. In other examples, the color filter array 202 may be manufactured separately from the metasurface lens and attached to the metasurface lens 500 after the manufacturing of the metasurface lens 500.

Figure 7:
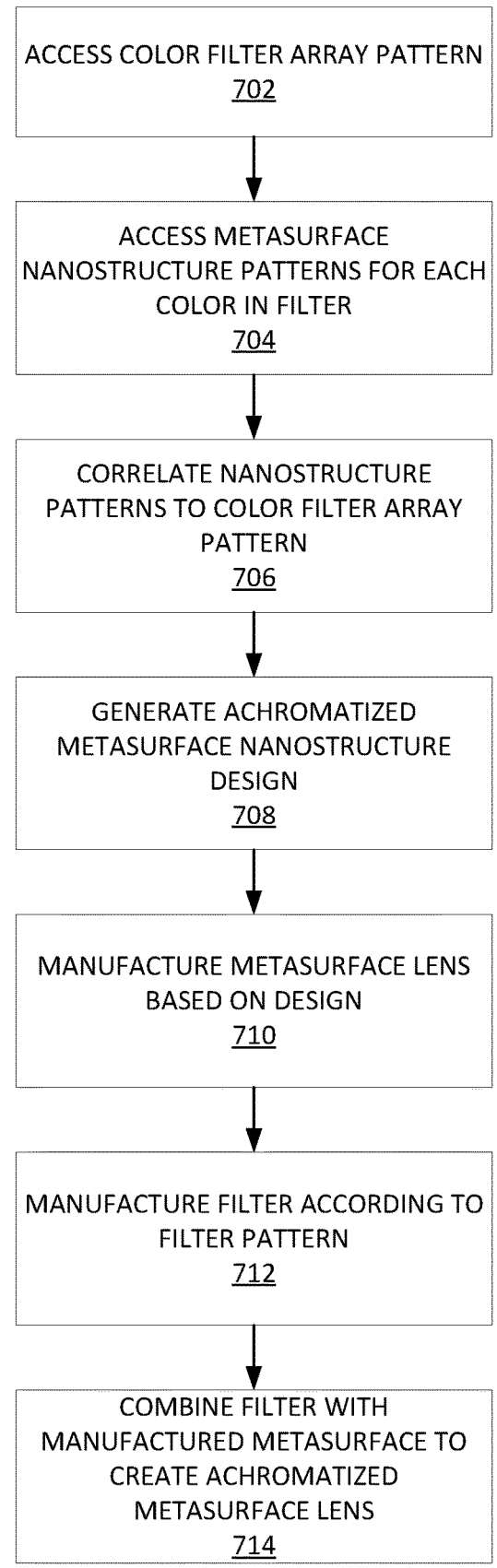
FIG. 7 depicts a method for manufacturing an achromatized metasurface lens according to an example of the present technology.

FIG. 7 depicts a method 700 for manufacturing an achromatized metasurface lens according to an example of the present technology. At operation 702, a color filter array pattern is accessed or otherwise obtained or created. The pattern of the color filter array may be similar to that of the color filter array depicted in FIG. 2. For instance, the pattern may be similar to a Bayer filter. The pattern of the color filter array may also consist of other sequential or lattice patterns. A pseudorandomized pattern may also be used for the color filter array to reduce potential diffraction artifacts of light passing through the color filter array. The color filter array pattern may include a plurality of different color filter elements that filter light for a plurality of different colors. At operation 704, nanostructure patterns for a metasurface lens are accessed (or otherwise obtained or created) for each of the plurality of different colors in the color filter array. For instance, where the color filter array has red, green, and blue color elements, three nanostructure patterns are accessed. In such an example, the nanostructure patterns include a first nanostructure pattern for a metasurface lens configured to modify red light, a second nanostructure pattern for a metasurface lens configured to modify green light, and a third nanostructure pattern for a metasurface lens configured to modify blue light. For example, the nanostructure patterns may correspond to the nanostructure patterns depicted in FIGS. 3A-3C and discussed above with reference to FIGS. 3A-3C.

At operation 706, the nanostructure patterns for each color in the color filter array accessed in operation 704 are correlated to the pattern of the color filter array accessed in operation 702. The correlation may include determining or identifying subsets of nanostructures in each of the nanostructure patterns that correspond to the respective shape and location of the color filter array elements in the color filter array. For example, the correlation my include determining or identifying the subsets of nanostructure patterns depicted in FIGS. 4A-4C and described above with reference to FIGS. 4A-4C.

At operation 708, a nanostructure design for an achromatized metasurface lens is generated. The nanostructure design for the achromatized metasurface lens may be generated from the correlated nanostructure patterns determined in operation 706. For example, the subsets of nanostructures depicted in FIGS. 4A-4C may be combined to generate an achromatized metasurface lens, such as the nanostructure pattern depicted in FIG. 5. Other possible techniques may be used to generate a nanostructure pattern for an achromatized metasurface lens. For instance, optical design software may be utilized once a color filter array pattern is known to generate a nanostructure pattern tuned to the color array filter for an achromatized metasurface lens.

Once the achromatized metasurface nanostructure design has been generated (or otherwise accessed or obtained), the metasurface lens for the achromatized metasurface lens may be manufactured or fabricated at operation 710. Multiple manufacturing or fabrication methods and techniques, such as lithographic techniques, for manufacturing nanostructures on a metasurface lens are known to those having skill in the art. Those manufacturing techniques are generally acceptable for use with the present technology. For instance, the methods and techniques set forth in the Arbabi reference are suitable for use in the present technology.

At operation 712, the color filter array is manufactured or fabricated, and at operation 714, the color filter array is combined with the metasurface lens manufactured in operation 710. In some examples, the color filter array may be manufactured or fabricated directly on the metasurface lens such that the different color filter array elements cover the corresponding subsets of nanostructures on the metasurface lens manufactured in operation 710. For instance, the color filter array may be lithographically produced on the metasurface lens such that each color filter element is located on the correct correspond subset of nanostructures. Similar techniques utilized in applying color filters, such as Bayer filters, to light sensors in digital cameras may be utilized to apply the color filter array to the metasurface lens. In other examples, the color filter array may be manufactured separately from the metasurface lens and then later combined with the metasurface lens to create the achromatized metasurface lens. In such examples, the color filter array may be combined with the metasurface lens using any techniques or methods suitable to optically align the appropriate color filter elements with the corresponding subsets of nanostructures on the metasurface. For instance, a red color filter element should be optically aligned with a subset of nanostructures configured to modify red light such that light passing through the red color filter element interacts with the subset of nanostructures configured to modify the red light in the desired manner, such as collimation.

While the achromatized metasurface lens is depicted and discussed above as operating a collimating lens, one will appreciate that the achromatized metasurface lens may be configured to operate as a focusing lens, converging lens, or a diverging lens, among other potential optical components. In addition, while the above description generally discusses the color filter array and metasurface lenses with respect to red, green, and blue colors, any combination of colors is feasible and is contemplated herein for different applications. Further, a combination of other colors producing a combined light color other than white may be useful for some applications. Although some specific devices have been recited throughout the disclosure as performing specific functions, one of skill in the art will appreciate that these devices are provided for illustrative purposes, and other devices can be employed to perform the functionality disclosed herein without departing from the scope of the disclosure.

As should be appreciated from the foregoing discussion, in one aspect, the technology relates to a head-mounted display system that includes a display source; and an achromatized metasurface lens positioned between the display source and a viewing position of the head-mounted display system, wherein the achromatized metasurface lens includes a color filter array combined with a metasurface lens having a nanostructure design based on the color filter array. In an example, the display source is a narrowband display source. In another example, the narrowband display source is one of a liquid crystal display (LCD) or a liquid crystal on silicon (LCoS) display type having a plurality of illuminants tuned to color filter elements of the color filter array. In yet another example, the color filter array includes a first plurality of color filter elements to filter a first wavelength of light, a second plurality of color filter elements to filter a second wavelength of light, and a third plurality of color filter elements to filter a third wavelength of light. In still yet another example, the achromatized metasurface lens includes: a first subset of nanostructures configured to modify the first wavelength of light, wherein the first subset of nanostructures is optically aligned with a color filter element from the first plurality of color filter elements; a second subset of nanostructures configured to modify the second wavelength of light, wherein the second subset of nanostructures is optically aligned with a color filter element from the second plurality of color filter elements; and a third subset of nanostructures configured to modify the third wavelength of light, wherein the second subset of nanostructures is optically aligned with a color filter element from the third plurality of color filter elements.

In another example, the first wavelength of light corresponds to a red color, the second wavelength of light corresponds to a green color, and the third wavelength of light corresponds to a blue color. In yet another example, the color filter array includes a plurality of color filter elements for between 2 and 256 different colors. In still yet another embodiment, the head-mounted display includes one or more cameras to provide video augmented reality content through the display source.

The technology also relates to an achromatized metasurface lens that includes a color filter array having a having a first color filter element for a first color of light, a second color filter element for a second color of light, and a third color filter element for a third color of light; and a metasurface lens located proximate to the color filter array, wherein the metasurface lens includes first subset of nanostructures configured to modify the first color of light, a second subset of nanostructures configured to modify the second color of light, and third subset of nanostructures configured to modify the third color of light. In an example, the first subset of nanostructures is optically aligned with the first color filter element; the second subset of nanostructures is optically aligned with the second color filter element; and the third subset of nanostructures is optically aligned with the third color filter element. In another example, the first subset of nanostructures is configured to collimate the first color of light; the second subset of nanostructures is configured to collimate the second color of light; and the third subset of nanostructures is configured to collimate the third color of light. In yet another example, the first color of light is red, the second color of light is green, and the third color of light is blue. In still yet another example, the color filter array further comprises additional color filter elements for additional colors of light other than the first color of light, the second color of light, and the third color of light.

In another example, the first subset of nanostructures is a subset of a nanostructure design for another metasurface lens configured to modify only the first color of light. In yet another example, the first color filter element has a surface area between 1-10 square microns. In still yet another example, the color filter array has a one of a lattice pattern or a pseudorandom pattern.

The technology also relates to a method for manufacturing an achromatized metasurface lens. The method includes lithographically manufacturing a metasurface lens according to a nanostructure design for the achromatized metasurface lens, wherein the nanostructure design includes a first subset of nanostructures configured to modify a first color of light, a second subset of nanostructures configured to modify a second color of light, and a third subset of nanostructures configured to modify a third color of light; and manufacturing a color filter array proximate to the manufactured metasurface lens such that a color filter element, in the color filter array, for the first color of light is optically aligned with the first subset of nanostructures on the metasurface lens. In an example, the method also includes correlating the accessed nanostructure patterns with a pattern for the color filter array. In another example, the method also includes generating the nanostructure design for the achromatized metasurface lens based on the correlated nanostructure patterns. In yet another example, the first color of light is red, the second color of light is green, and the third color of light is blue.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art. The scope of the technology is defined by the following claims and any equivalents therein.

What is claimed is:

1. A head-mounted display system comprising:
 a display source; and an achromatized metasurface lens positioned between the display source and a viewing position of the head-mounted display system, wherein the achromatized metasurface lens is configured to collimate light emitted from the display source and includes:
　a color filter array including:
　　a first plurality of color filter elements to filter a first wavelength of light emitted from the display source; and
　　a second plurality of color filter elements to filter a second wavelength of light emitted from the display source; and
　a metasurface lens having a nanostructure design based on the color filter array, the metasurface lens including:
　　a first subset of nanostructures configured to modify the first wavelength of light, wherein the first subset of nanostructures is optically aligned with a color filter element from the first plurality of color filter elements; and
　　a second subset of nanostructures configured to modify the second wavelength of light, wherein the second subset of nanostructures is optically aligned with a color filter element from the second plurality of color filter elements.

2. The head-mounted display system of claim 1, wherein the display source is a narrowband display source.

3. The head-mounted display system of claim 2, wherein the narrowband display source is one of a liquid crystal display (LCD) or a liquid crystal on silicon (LCoS) display type having a plurality of illuminants tuned to color filter elements of the color filter array.

4. The head-mounted display system of claim 1, wherein the color filter array further includes a third plurality of color filter elements to filter a third wavelength of light.

5. The head-mounted display system of claim 4, wherein the achromatized metasurface lens further includes:
　a third subset of nanostructures configured to modify the third wavelength of light, wherein the second subset of nanostructures is optically aligned with a color filter element from the third plurality of color filter elements.

6. The head-mounted display of claim 4, wherein the first wavelength of light corresponds to a red color, the second wavelength of light corresponds to a green color, and the third wavelength of light corresponds to a blue color.

7. The head-mounted display of claim 1, wherein the color filter array includes a plurality of color filter elements for between 2 and 256 different colors.

8. The head-mounted display of claim 1, wherein the head-mounted display includes one or more cameras to provide video augmented reality content through the display source.

9. An achromatized metasurface lens comprising:
　a color filter array having:
　　a first color filter element for a first color of light,
　　a second color filter element for a second color of light, and
　　a third color filter element for a third color of light; and
　a metasurface lens located proximate to the color filter array and configured to collimate light emitted from the display source, wherein the metasurface lens includes:
　　a first subset of nanostructures configured to modify the first color of light, wherein at least one of the first subset of nanostructures is optically aligned with the first color filter element,
　　a second subset of nanostructures configured to modify the second color of light, wherein at least one of the second subset of nanostructures is optically aligned with the second color filter element, and
　　a third subset of nanostructures configured to modify the third color of light wherein at least one of the third subset of nanostructures is optically aligned with the third color filter element.

10. The achromatized metasurface lens of claim 9, wherein:
　the first subset of nanostructures is configured to collimate the first color of light;
　the second subset of nanostructures is configured to collimate the second color of light; and
　the third subset of nanostructures is configured to collimate the third color of light.

11. The achromatized metasurface lens of claim 9, wherein the first color of light is red, the second color of light is green, and the third color of light is blue.

12. The achromatized metasurface lens of claim 9, wherein the color filter array further comprises additional color filter elements for additional colors of light other than the first color of light, the second color of light, and the third color of light.

13. The achromatized metasurface lens of claim 9, wherein the first subset of nanostructures is a subset of a nanostructure design for another metasurface lens configured to modify only the first color of light.

14. The achromatized metasurface lens of claim 9, wherein the first color filter element has a surface area between 1-10 square microns.

15. The achromatized metasurface lens of claim 9, wherein the color filter array has a one of a lattice pattern or a pseudorandom pattern.

16. A method for manufacturing an achromatized metasurface lens, the method comprising:
　lithographically manufacturing a metasurface lens according to a nanostructure design for the achromatized metasurface lens, wherein the nanostructure design includes a first subset of nanostructures configured to modify a first color of light, a second subset of nanostructures configured to modify a second color of light, and a third subset of nanostructures configured to modify a third color of light; and
　manufacturing a color filter array proximate to the manufactured metasurface lens such that a color filter element, in the color filter array, for the first color of light is optically aligned with the first subset of nanostructures on the metasurface lens.

17. The method of claim 16, further comprising correlating the accessed nanostructure patterns with a pattern for the color filter array.

18. The method of claim 17, further comprising generating the nanostructure design for the achromatized metasurface lens based on the correlated nanostructure patterns.

19. The method of claim 16, wherein the first color of light is red, the second color of light is green, and the third color of light is blue.

20. The method of claim 16, wherein:
　the first subset of nanostructures is configured to collimate the first color of light;
　the second subset of nanostructures is configured to collimate the second color of light; and
　the third subset of nanostructures is configured to collimate the third color of light.

* * * * *